J. R. RUNIONS.
BAG HOLDER AND FILLER.
APPLICATION FILED DEC. 27, 1916.
1,244,900.
Patented Oct. 30, 1917.
2 SHEETS—SHEET 1.
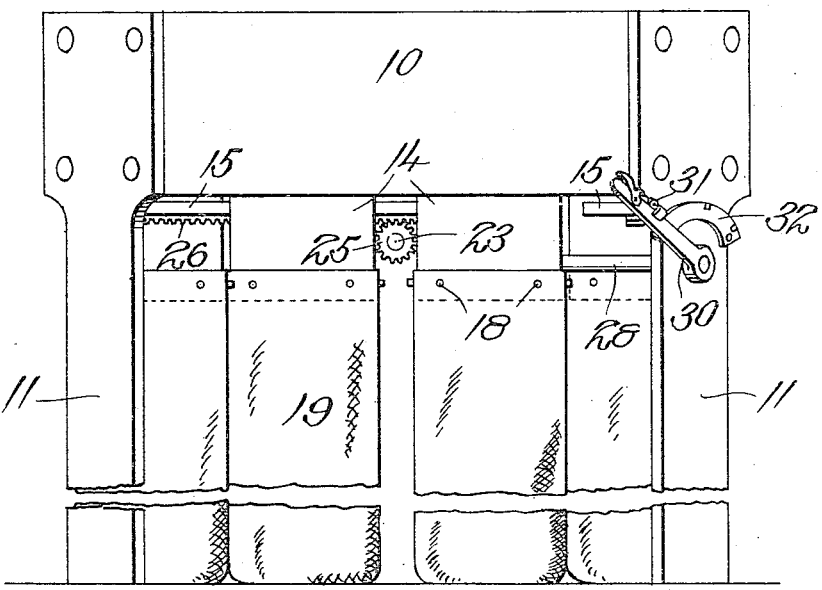
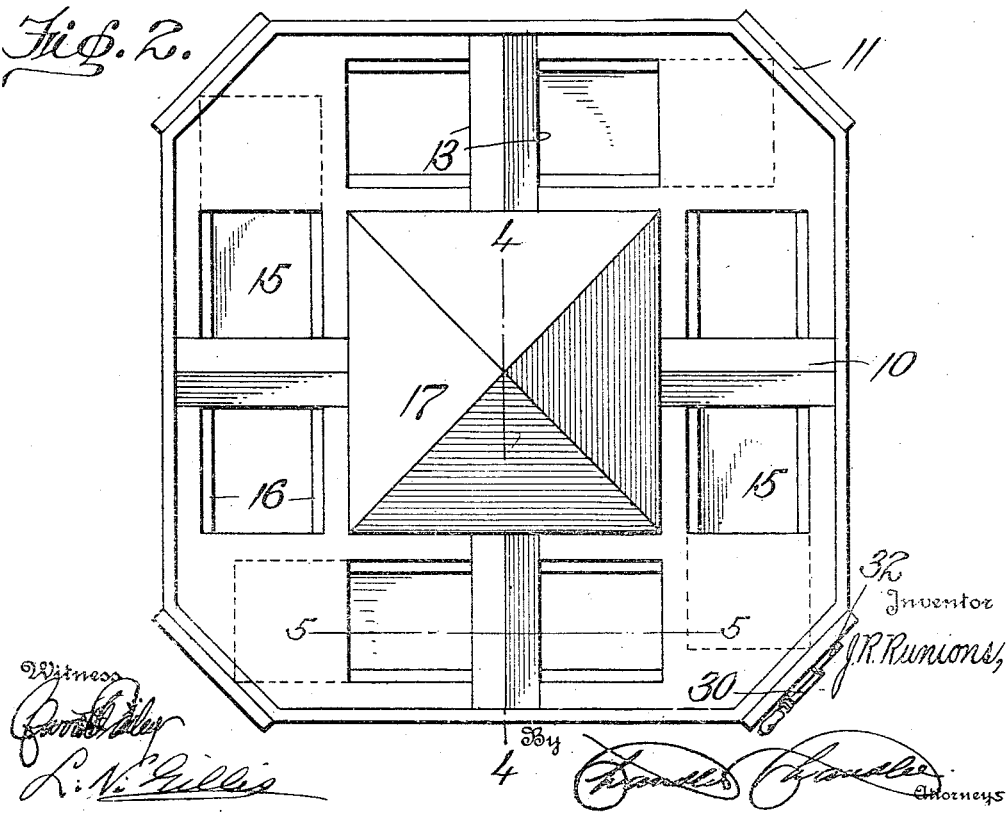

J. R. RUNIONS.
BAG HOLDER AND FILLER.
APPLICATION FILED DEC. 27, 1916.
1,244,900.
Patented Oct. 30, 1917
2 SHEETS—SHEET 2.
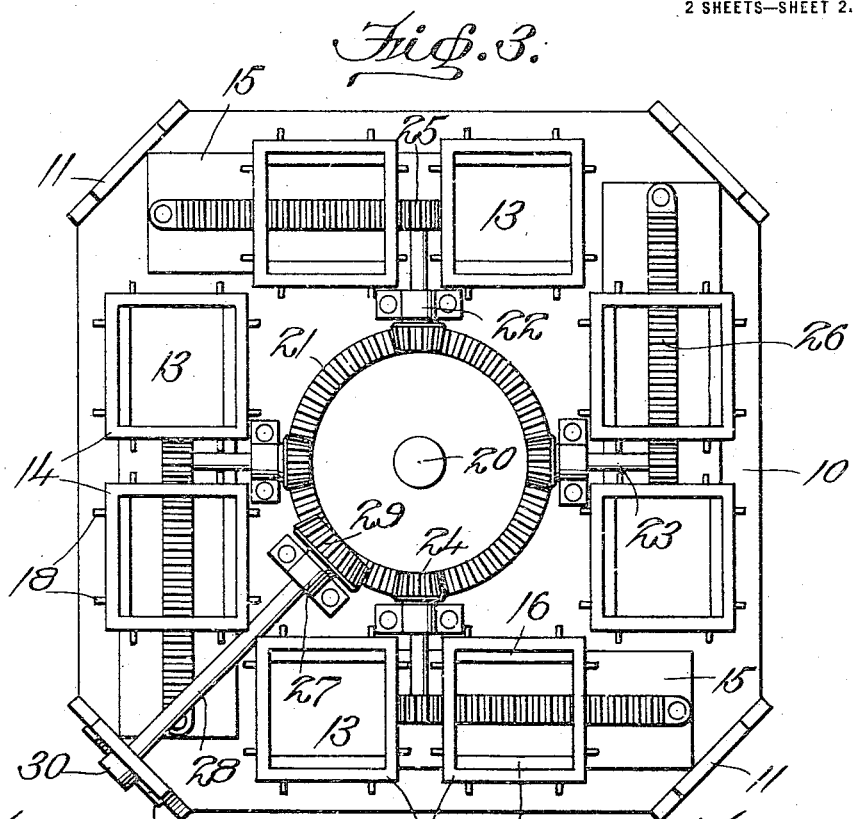
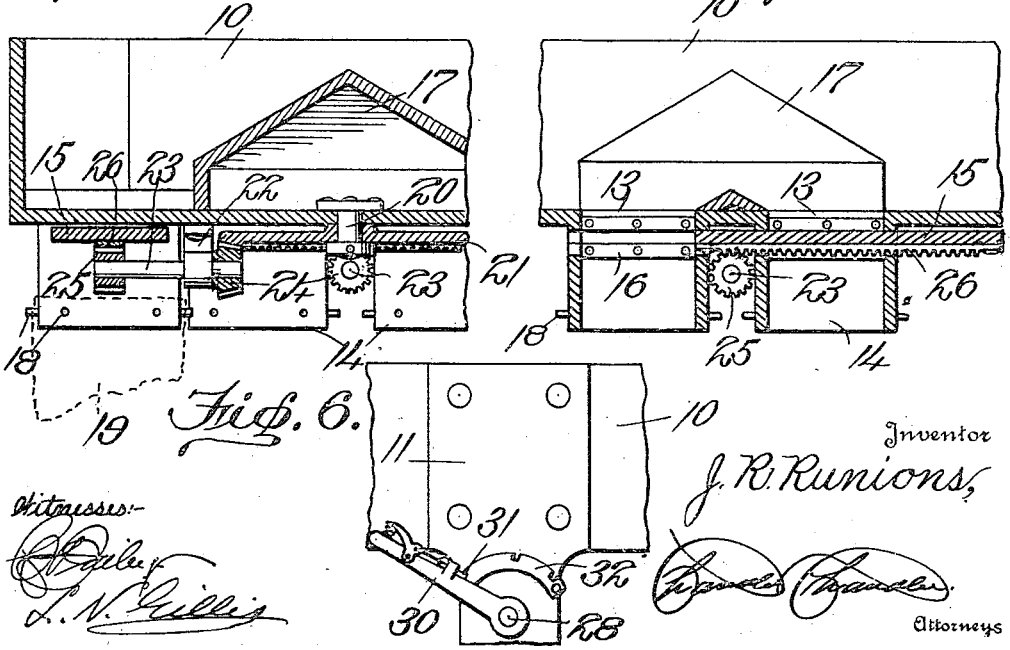
Inventor
J. R. Runions,
Attorneys
Witnesses:

UNITED STATES PATENT OFFICE.

JAMES R. RUNIONS, OF COAL HARBOR, NORTH DAKOTA.

BAG HOLDER AND FILLER.

1,244,900. Specification of Letters Patent. Patented Oct. 30, 1917.

Application filed December 27, 1916. Serial No. 139,207.

*To all whom it may concern:*

Be it known that I, JAMES R. RUNIONS, a citizen of the United States, residing at Coal Harbor, in the county of McLean, State of North Dakota, have invented certain new and useful Improvements in Bag Holders and Fillers; and I do hereby declare the following to be a full, clear, and exact description of the invention, such as will enable others skilled in the art to which it appertains to make and use the same.

This invention relates to bag fillers and has special reference to improvements on my co-pending application for Letters Patent on bag holder and filler, No. 753,553, filed March 11, 1913.

One important object of the invention is to provide a bag filler of this character wherein the filling chutes will be arranged in pairs and will be provided with valves controlled by a novel arrangement of mechanism so that one of each pair of chutes will be open and the other closed at any given time, all of the chutes being operated simultaneously.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is a side elevation of a bag filler constructed in accordance with this invention.

Fig. 2 is a top plan view thereof.

Fig. 3 is a bottom plan view thereof.

Fig. 4 is a vertical transverse section on the line 4—4 of Fig. 2.

Fig. 5 is a detail section on the line 5—5 of Fig. 2 and showing the operating means.

Fig. 6 is a face view of the operating shaft, its handle and quadrant.

In the embodiment of the invention herein illustrated there is disclosed a hopper 10 which is provided with suitable standards or legs 11 for elevating the hopper a distance above the floor sufficient to permit bags to be hung their full length beneath the hopper by means which will hereinafter be apparent. In the bottom 12 of the hopper and spaced circularly therearound are openings 13 each of which communicate with a pair of depending discharge spouts 14.

Slidable transversely in each of these spouts is a slide valve or plate 15, the same sliding on suitable guides 16. This valve or plate is so arranged that when it is moved into one position it uncovers or opens one of the spouts while, when moved into a second position, it closes the uncovered spout and uncovers the other spout of the pair, there thus being one spout open and one closed whenever the valve is in its extreme positions.

Mounted centrally on the bottom within the hopper and projecting above the bottom is a rectangular pyramid shaped deflector 17, this deflector causing material which is deposited within the hopper to run to the openings 13 above the spouts 14. Projecting from a plurality of points on the lower end of the spout 14 are pins or hooks 18 on which are impaled the mouths of the bags 19.

At 20 is a vertical shaft whereon is revolubly mounted a gear 21, the gear being preferably a bevel gear. Surrounding this bevel gear 21 are the bearings 22 which are alined centrally of the respective pairs of spouts. Through each of these bearings 22 extends a shaft 23 which is provided on one end with a gear 24 meshing with the gear 21 while on the other end of each shaft there is provided a gear 25 which meshes with a segmental gear or rack 26 fixed to a respective valve.

In addition to the bearings 22 there is also provided a further radial bearing 27 wherethrough runs a shaft 28 having on one end a gear 29 which meshes with the central gear 21. On the other end of this shaft 28 there is provided an operating handle 30 which carries a latch 31 working over a quadrant 32 suitably supported so that as the operating lever is moved from one position to another the latch acts to releasably lock it in said position.

From the foregoing construction it will be obvious that as the handle or lever 30 is moved to one side or the other the shaft 28 will oscillate and this in turn, will through the gear 29 cause movement alternately in opposite directions of the central gear 21. This movement of this central gear 21 will so operate the gears 24 and their shafts 23 that through the medium of the gears 25 and segmental gears 26 the valves are shifted simultaneously in one direction or the other.

Now it is to be observed that as the valve is shifted in one direction one of each pair of the spouts will be opened while, when the valves are shifted in the opposite direction, the other of each pair will be opened. In use, it is preferred to hang below each individual spout, through the medium of hooks, one of the bags. Then, by operating the handle 30 one of each pair of bags thus suspended is filled. When all of the bags have been filled then the handle is shifted to the opposite position and the spout above the filled bag in each pair is closed off. At the same time the spout above the empty bag of each pair is opened. The material will flow into the empty bags and during the time of this flow the filled bags may be removed and replaced by empty bags. By conducting the operation in this manner it is practically continued since there is no time when both spouts are closed off and during the removal and replacement of one filled bag the other bag is filling.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

1. A bag filling machine comprising in combination with a hopper having a plurality of outlet openings, a horizontal plate adapted for sliding movement for controlling either of two of said outlets, a rack carried by each of said plates, a circular rack, means for operating said circular rack, and means connecting said sliding plates with said circular rack to simultaneously slide said plates upon reciprocating the circular rack.

2. A bag filling machine comprising in combination with a hopper having a plurality of discharge openings arranged in pairs, a sliding plate adapted to alternately open and close the discharge openings in each pair, a rack carried by each sliding plate, a circular rack, means for reciprocating said circular rack, and means engaging the circular rack and the racks on the sliding plates to operate said sliding plates upon oscillation of the circular rack.

3. In a hopper having a plurality of discharge openings arranged in pairs, a sliding plate for alternately opening and closing the separate openings in each pair of discharge openings, and means operable in one direction to simultaneously operate said plates to open one of the discharge openings in each pair, and operable in the opposite direction to simultaneously operate said plates to close said opening, and open the other opening in each pair.

In testimony whereof, I affix my signature, in the presence of two witnesses.

JAMES R. RUNIONS.

Witnesses:
M. R. FUGLIE,
J. S. SIGURDSON.

Copies of this patent may be obtained for five cents each, by addressing the "Commissioner of Patents, Washington, D. C."